United States Patent [19]

Schneider

[11] 4,042,011
[45] Aug. 16, 1977

[54] REFRIGERATION CONTROL

[75] Inventor: Julius E. Schneider, Bartlesville, Okla.

[73] Assignee: Phillips Petroleum Company, Bartlesville, Okla.

[21] Appl. No.: 642,882

[22] Filed: Dec. 22, 1975

[51] Int. Cl.$^2$ .................. B01D 3/42; B01D 5/00; F25J 3/00
[52] U.S. Cl. ............................ 165/1; 55/29; 55/171; 55/163; 165/39
[58] Field of Search ............................ 55/20, 29–32, 55/171–179, 163; 165/34, 36, 39; 260/676 H

[56] References Cited

U.S. PATENT DOCUMENTS

| | | |
|---|---|---|
| 3,106,462 | 10/1963 | Cottle ............................ 55/20 |
| 3,347,019 | 10/1967 | Barnhart ............................ 55/32 |
| 3,470,069 | 9/1969 | Bracken et al. ............................ 55/20 X |
| 3,633,658 | 1/1972 | Kirschner et al. ............................ 165/39 |
| 3,676,981 | 7/1972 | Afdahl et al. ............................ 55/30 |
| 3,863,708 | 2/1975 | Grimes ............................ 165/39 X |

Primary Examiner—Charles N. Hart
Assistant Examiner—Robert H. Spitzer

[57] ABSTRACT

A first fluid stream is cooled by passage through two heat exchange zones in sequence in countercurrent flow with a second fluid stream, a part of the second stream being bypassed around the second zone and passed through the first heat exchange zone and the relative flow of the second fluid stream passing through the two heat exchange zones being controlled to maintain a selected temperature of the first stream between the two zones.

12 Claims, 2 Drawing Figures

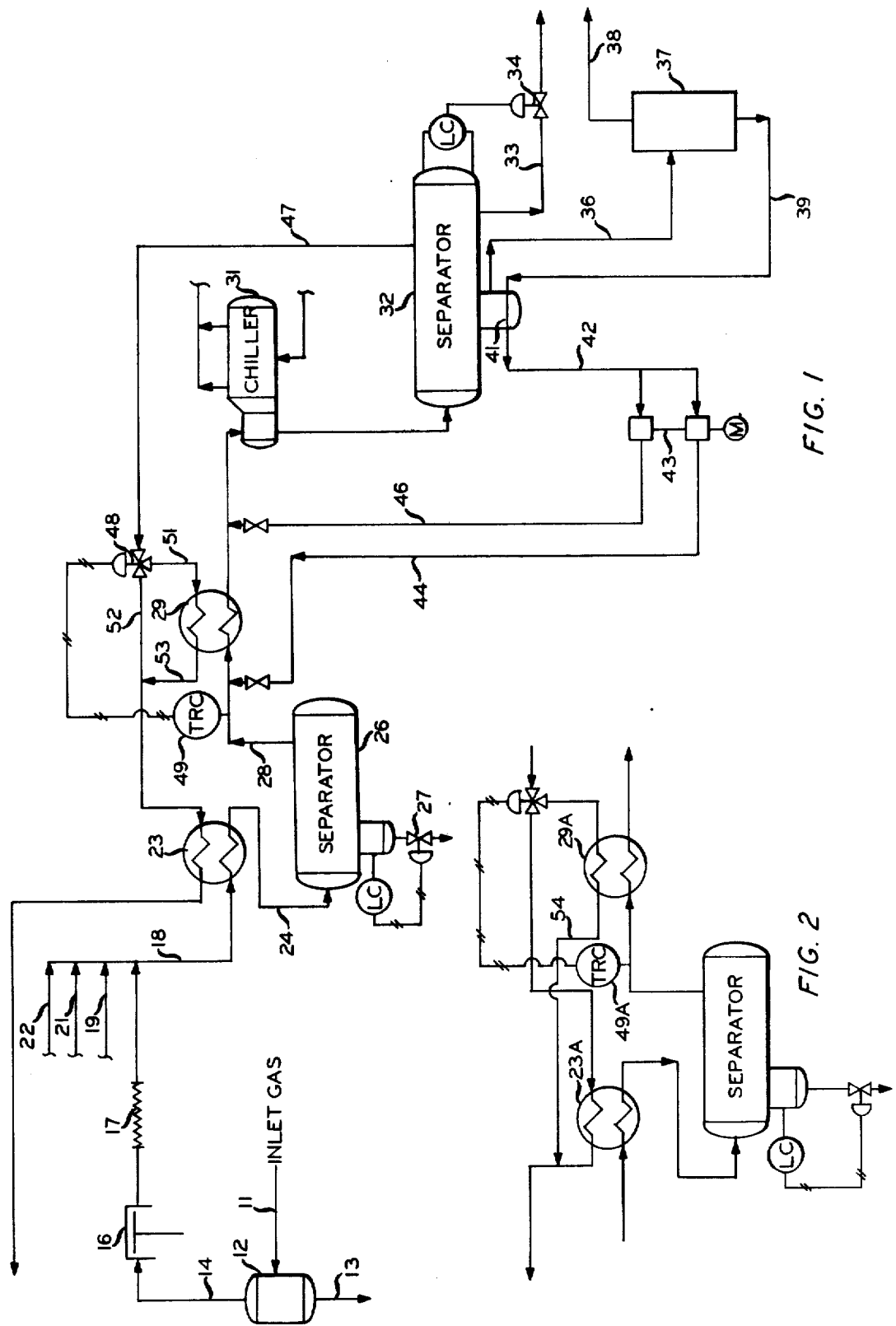

REFRIGERATION CONTROL

BACKGROUND OF THE INVENTION

This invention relates to a process and apparatus for controlling the flow of a refrigerant in countercurrent heat exchange with a stream being cooled.

Although the invention is applicable broadly, it finds particular utility in processing raw natural gas. In the gathering of such raw natural gas it is frequently expedient to process relatively small volumes, for example in the neighborhood of 1 to 25 million standard cubic feet per day (MMSCFD) which is about 0.03–0.80 m$^3$/s in the field. Such processing may often include steps of phase separation, compression, and heat exchange.

It is desirable that such facilities be maintained simple and straightforward in operation so that they can operate with a minimum of maintenance and operator attention. It is also desirable that such units require a minimum of utility facilities. Where raw natural gas streams are to be cooled it is necessary to take steps to avoid the formation of hydrates which can cause plugging of heat exchangers or other equipment.

An object of the invention is to cool a raw natural gas stream in a simple and straightforward manner. Another object of the invention is to cool a raw natural gas stream for further processing without the formation of hydrates. Another object of the invention is to utilize available refrigeration fully while avoiding hydrate formation with a minimum use of hydrate inhibtor. Another object of the invention is to control the flow of a refrigerant in countercurrent flow with a fluid stream being cooled.

SUMMARY OF THE INVENTION

According to the invention a first fluid stream is cooled by passage through two heat exchange zones in sequence in countercurrent flow with a second fluid stream, a part of said second fluid stream is bypassed around the second heat exchange zone and passed through the first heat exchange zone and the relative amounts of the second fluid stream passing through the second heat exchange zone and being bypassed around the second heat exchange zone are controlled in response to the temperature of the first stream between the heat exchange zones.

The part of the second fluid stream which passes through the second heat exchange zone can be recovered separately or can be used to provide additional refrigeration by passage through all or a part of the first heat exchange zone. This can be accomplished by passage through separate heat exchange passageways or the second part of the second fluid stream can be combined with the bypassed portion either before or after the bypassed portion passes through the first heat exchange zone or combined at an intermediate point in the first heat exchange zone.

The invention finds particular utility in processing raw natural gas and, in a specific embodiment, provides the steps of compression and air cooling of the incoming raw gas, further cooling by gas-gas heat exchange to a temperature safely above the hydrate temperature, phase separation to remove any condensed water and hydrocarbon, and injection of a hydrate inhibitor into the gas before or as it enters a second gas-gas exchanger where the incoming gas is further cooled. Additional hydrate inhibitor can be injected into the gas after it issues from the second gas-gas heat exchanger and the gas passed through a refrigerated third exchanger where the incoming gas is further cooled for condensation of C$_2$+ hydrocarbons and/or water. Gas and condensates from the refrigerated exchanger pass through a hydrate inhibitor separator from which liquid hydrocarbons pass to further processing and water-rich hydrate inhibitor passes to regeneration facilities.

Cold residue gas from the hydrate inhibitor separator flows via a three-way control valve to the two gas-gas heat exchangers and thence to a pipeline or other use. The three-way control valve provides for a bypass around the second gas-gas heat exchanger for use in the first gas-gas heat exchanger. As indicated above, the gas which flows through the second heat exchanger can be used to provide additional refrigeration by passage through all or a part of separate passageways in the first heat exchange zone or can be combined with the bypass gas either before or after it enters the first exchanger or at an intermediate point.

By controlling the three-way valve in response to the temperature of the incoming gas between the two exchangers, it is possible to control the system in such a way that the maximum amount of water is condensed from the raw gas in the first gas-gas exchanger and removed from the system via the subsequent phase separator before the injection of hydrate inhibitor for subsequent cooling to lower the gas below its hydrate temperature. In this manner the use of hydrate inhibitor is minimized thus reducing the load on the hydrate inhibitor regeneration unit. In addition, full utilization of the cool residue gas is always obtained since all of the gas flows through one or both of the two exchangers at all times.

DRAWING

In the drawing FIG. 1 is a diagrammatic representation of the invention applied to the treatment of raw natural gas.

FIG. 2 is a modification of the embodiment of FIG. 1.

DESCRIPTION OF PREFERRED EMBODIMENTS

In FIG. 1 gas enters through inlet pipe 11 to knock out drum 12. Any liquid removed is taken through liquid removal pipe 13 with the gas passing through overhead pipe 14 to compressor 16, air cooler 17 and header 18. Additional similar gas inlet pipes 19, 21 and 22 can be provided.

From header 18 the gas passes through first heat exchanger 23 and then, through pipe 24, to first phase separator 26. Liquid is removed from first phase separator 26 through liquid level control valve 27 and the uncondensed remainder passes through pipe 28, second heat exchanger 29 and chiller 31 to second phase separator 32.

Condensed hydrocarbon products are removed through pipe 33 under control of liquid level control valve 34. Water and hydrate inhibitor are removed through pipe 36 to regenerator 37 from which water is removed through pipe 38 and regenerated hydrate inhibitor returned through pipe 39. The hydrate inhibitor is cooled by passage through coil 41 located in the lower part of separator 32 and then through pipe 42 through pump 43 and then through pipes 44 and 46 to the inlet gas stream ahead of exchanger 29 and chiller 31, respectively.

Cold residue gas is removed from separator 32 through pipe 47 to three-way control valve 48. Valve 48 is under the control of temperature recorder controller 49 and proportions the amount of residue gas which passes through pipe 51 to second heat exchanger 29 and through bypass pipe 52 to first exchanger 23.

In the embodiment of FIG. 1 the residue gas effluent from second heat exchanger 29 is passed through pipe 53 to join the gas in pipe 52 for passage through first heat exchanger 23. In the embodiment of FIG. 2 on the other hand, the residue gas effluent from the second heat exchanger 29A is passed through pipe 54 to join the residue gas stream effluent from first heat exchanger 23A. It is also within the scope of the invention to combine the effluent from the second heat exchanger with that portion of the residue gas going through the first heat exchanger at any intermediate point within the first heat exchanger. As described above the residue gas effluent from second heat exchanger 29 can be used to provide additional refrigeration in the first heat exchange zone by passage through one or more separate passageways in said zone extending through a part or the entire length of the zone.

In the operation of a system such as the one described above, it is clear that the temperature of the raw gas in header 18 can vary considerably depending upon ambient temperatures. It is desirable, in order to minimize the amount of hydrate inhibitor required, to remove as much water as is possible without going below hydrate forming temperature. On the other hand, it is desirable, in order to minimize the refrigeration requirements for chiller 31, to utilize the cooling capacity of the residue gas as completely as possible. These objects are accomplished by the practice of the present invention. By the action of temperature recorder controller 49 in operating three-way valve 48, an amount of residue gas refrigeration capacity is caused to pass through first heat exchanger 23, or first heat exchanger 23A, which cools the raw gas stream to a value which gives maximum water condensation without hydrate formation. On the other hand, any refrigeration capacity not needed in the first heat exchanger is utilized in the second heat exchanger.

Under conditions at which there is insufficient cooling capacity in the residue gas to cool the incoming gas stream to the set point of temperature recorder controller 49, three-way valve 48 will be operated to close the entry into line 51 thus sending all of the residue gas stream directly through first heat exchanger 23 bypassing heat exchanger 29. On the other hand, at any time that the cooling capacity in the residue gas stream is more than required to bring the incoming stream to the set point of controller 49, a portion of the gas is permitted to pass through pipe 51 and heat exchanger 29. If the temperature of the gas stream as sensed by temperature recorder controller 49 or 49A remains below the set point thereof, the entire residue gas stream passes through the second heat exchanger 29 or 29A. In the embodiment of FIG. 2 this results in a complete bypassing of heat exchanger 23A.

EXAMPLE

In a calculated example according to the invention ten million standard cubic feet per day (MMSCFD) (0.328m³/s) of wet natural gas which is substantially methane but contains minor amounts of ethane and heavier hydrocarbons is compressed to about 500 psig (3.55 MPa) in compressor 16 and cooled in air-fin exchanger 17 to 120° F. (49° C.) at which point the gas contains about 178 lb/MMSCF (2.85 gm/m³) of water.

The gas is heat exchanged in first heat exchanger 23 with dry −35° F. (−37° C.) residue gas to about 82° F. (28° C.), condensing out part of the water which is removed in phase separator 26. From the phase separator the cooled gas flows through second exchanger 29 which in this case receives none of the cold residue gas for heat exchange since temperature recorder controller 49 on the raw gas flowing to the second exchanger is above its set point of 80° F. (27° C.), which has caused the three-way motor valve 48 to divert the entire cold residue gas stream to the first exchanger 23. The 82° F. raw gas which now contains only 58 lb/MMSCF (0.93 gm/m³) of water then passes to the chiller 31 where it is cooled by evaporating propane refrigerant to −35° F. (−37° C.) to effect condensation of moisture and $C_2$− hydrocarbons from the gas. To protect the chiller from hydrate formation the exchanger inlet is sprayed with 1.17 lb/min (8.82 gm/s) of 75 weight percent ethylene glycol solution as a hydrate inhibitor. The refrigerated gas passes to glycol separator 32 where 1.25 lb/min (9.45 gm/s) of 70 weight percent glycol is removed, the glycol having become diluted by its absorption of 0.08 lb/min (0.60 gm/s) of moisture from the gas. The refrigerated residue gas, which now contains only 0.6 lb/MMSCF (0.01 gm/m³) of water then passes via three-way control valve 48 which serves to direct the flow to the gas heat exchange serving to cool the incoming feed as described above and thence to the pipeline or other use. In this case all the gas flows directly to first heat exchanger 32. The water rich (70 weight percent) glycol passes to glycol still 37 for reconcentration and recycling; condensed hydrocarbons which accumulate as a separate layer in glycol separator 32 are removed to liquid hydrocarbon processing equipment not shown.

Had the raw gas from the air-fin exchanger been cooler, a portion of the cold residue gas would have been directed through the second exchanger. For example, had the gas to the first gas-gas exchanger been at a temperature of 82° F. (28° C.), most of the cold residue gas would have been directed through the second exchanger with the overall result that the incoming gas temperature would have exited the second exchanger at about 57° F. (14° C.). Glycol injection into the second exchanger would have been required in this instance to prevent hydrate formation in said exchanger. As a precautionary measure it is generally desirable to inject some glycol into this exchanger under all circumstances to provide for the unanticipated onset of hydrate conditions.

It is within the scope of the invention to use any convenient desiccant material as the injection agent to prevent hydrate formation. For example, any of the common glycols such as ethylene, diethylene, triethylene or tetraethylene glycol are suitable. Various alcohols, and particularly methanol, may also be used.

It is also within the scope of the invention to use any flow-splitting device in place of the three-way valve to direct residue gas flows to the gas-gas exchangers. For example, ordinary control valves on the residue gas to each exchanger could be used.

What is claimed is:
1. A process for cooling a first fluid stream with a second fluid stream which comprises:
    cooling said first stream by passage through a first heat exchange zone;
    measuring the temperature of said first stream after passing through said first heat exchange zone;

cooling said first stream further by passage through a second heat exchange zone;

heating a first part of said second fluid stream by passing through said second heat exchange zone while passing a second part of said second fluid stream through a bypass zone around said second heat exchange zone;

heating said second part of said second fluid stream by passage through said first heat exchange zone; and controlling the flow of said first and second part of said second fluid stream in response to the measured temperature of said first stream.

2. The process of claim 1 wherein said first part of said second fluid stream after passing through said second heat exchange zone is passed through at least a portion of said first heat exchange zone.

3. The process of claim 2 wherein said first part of said second fluid stream after passage through said second heat exchange zone is combined with said second part of said second fluid stream prior to passage of said second part of said second fluid stream through said first heat exchange zone.

4. The process of claim 1 wherein said first part of said second fluid stream bypasses said first heat exchange zone.

5. The process of claim 1 wherein said first stream is a gas containing water vapor and the passage of said first stream through said first heat exchange zone condenses a portion of said water vapor;

wherein said condensed water vapor is separated from said first stream;

wherein the remainder of said first stream is further cooled in said second cooling zone; and wherein the flow of said first and second parts of said second fluid stream is controlled to maximize the condensation of water vapor from said first stream in said first heat exchange zone while avoiding hydrate formation.

6. The process of claim 5 further comprising adding a hydrate inhibitor to the remainder of said first stream prior to passage through said second heat exchange zone.

7. The process of claim 5 wherein said first part of said second fluid stream after passing through said second heat exchange zone is passed through at least a portion of said first heat exchange zone.

8. The process of claim 5 wherein said gas containing water vapor in said first stream is natural gas containing at least one condensible hydrocarbon;

wherein a hydrate inhibitor is added to the remainder of said first stream after removal of the condensed water vapor and prior to being cooled in said second cooling zone;

wherein a second amount of hydrate inhibitor is added to the remainder of said gas stream after said gas stream is cooled in said second heat exchange zone;

wherein the remainder of said gas stream is further cooled by passage through a third heat exchange zone in countercurrent heat exchange flow with a cold refrigerant thereby condensing at least a portion of said condensible hydrocarbon;

wherein the condensed condensible hydrocarbon is separated from said gas stream to produce a liquid hydrocarbon stream and a residue gas stream; and wherein said second fluid stream is said residue gas.

9. The process of claim 8 wherein said first part of said second fluid stream after passing though said second heat exchange zone is passed through at least a portion of said first heat exchange zone.

10. The process of claim 9 wherein said hydrate inhibitor component is ethylene glycol.

11. Apparatus for cooling a first fluid stream with a second fluid stream which comprises:

a first heat exchanger;

means for passing a first fluid stream through said first heat exchanger;

means to measure the temperature of said first stream after passing through said first heat exchanger;

a second heat exchanger;

means to pass said first stream through said second heat exchanger for further cooling;

means to pass a first part of a second fluid stream through said second heat exchanger in heat exchange relation with said first fluid stream;

means to pass a second part of said second fluid stream through a bypass around said second heat exchanger and then through said first heat exchanger in heat exchange relation with said first stream; and means to control the flow of said first and second parts of said second fluid stream in response to the measured temperature of said first fluid stream.

12. The apparatus of claim 11 wherein said first fluid stream is a natural gas stream containing water vapor and said second fluid stream is a residue gas stream;

wherein said apparatus comprises means to separate condensed water vapor from said natural gas stream after leaving said first heat exchanger;

means to add a hydrate inhibitor to said natural gas stream after separation of said condensed water vapor and prior to passage of said stream through said second heat exchanger;

means for adding a second amount of hydrate inhibitor to said natural gas stream after leaving said second heat exchanger;

a third heat exchanger;

means to pass said natural gas stream containing said second amount of hydrate inhibitor through said third heat exchanger;

means to pass a cold refrigerant through said third heat exchanger in heat exchange relation with said natural gas stream to condense at least a portion thereof; and means to separate said natural gas stream after leaving said third heat exchanger to produce a liquid hydrocarbon stream and said residue gas stream.

* * * * *